April 28, 1931. A. A. A. DARCHE 1,802,632
PISTON FOR MOTORS WITH INTERNAL COMBUSTION
Filed Nov. 30, 1928
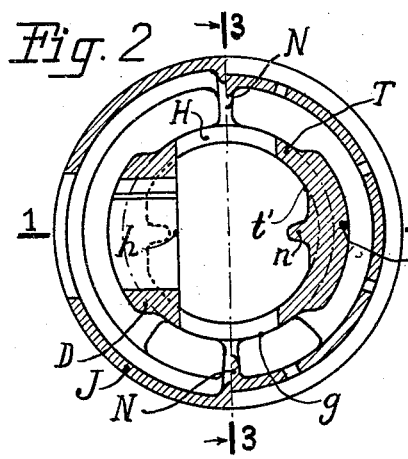
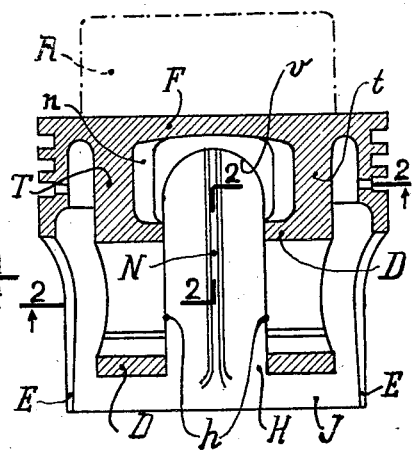
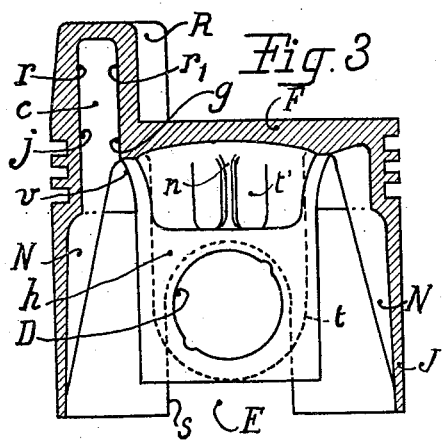
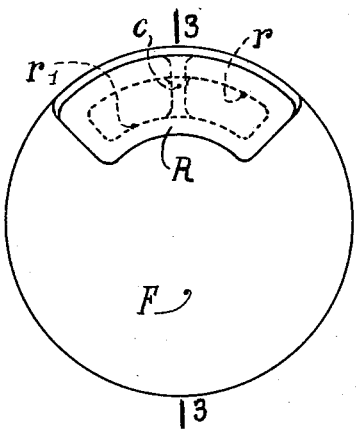
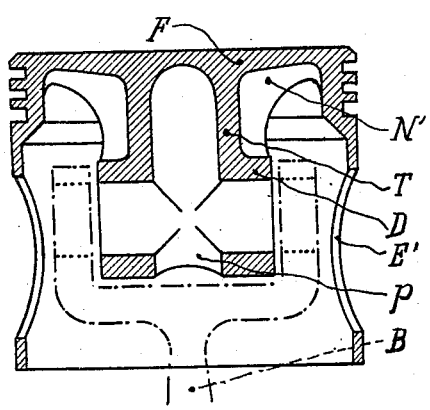

Patented Apr. 28, 1931

1,802,632

UNITED STATES PATENT OFFICE

ALBERT ALEXANDRE AUGUSTIN DARCHE, OF ALGIERS, FRANCE

PISTON FOR MOTORS WITH INTERNAL COMBUSTION

Application filed November 30, 1928, Serial No. 322,892, and in France December 12, 1927.

The object of the present invention is to effect improvements in the construction of the piston, by which there is produced a resilient skirt which is efficient to assure for the piston a proper engagement over its entire peripheral surface with the corresponding surface of the cylinder, and enables the piston to have a very small clearance in the cylinder, inasmuch as the lower portion of the piston can be as large or even a trifle larger in diameter than the cylinder.

The invention will be better understood by reference to the annexed drawings showing diagrammatically by way of example several embodiments.

Figure 1 is a diametrical section on the line 1—1 of Figure 2, in the plane of the wrist pin.

Figure 2 is a horizontal section on the planes indicated by the line 2—2 of Figure 1, showing a portion of the piston at the level of the wrist pin and a portion above the same.

Figure 3 is a diametrical section on the line 3—3 of Figures 2 and 4 of a form of the piston having a vertically upward extension.

Figure 4 is a plan of the same.

Figure 5 is a sectional view similar to Figure 1 illustrating a modified form of piston having a central sleeve or boss depending from the head, and a continuous skirt portion.

It will be understood that the bearings for the wrist pin are fixed directly to the head F of the piston by a central tubular extension.

The central tubular extension T is provided with vertical openings H which extend upwardly from its lower end. The edges $h$ of the openings H are connected between them, preferably by an arch $v$.

In its lower part and up to a lever above the diameter of the wrist pin, the central tubular extension is strongly reinforced internally on each side by a large flat portion also parallel to the plane of rotation of the crank and extending to each edge $h$, Figures 1, 2 and 3, of the cut-out portions or openings H provided in the central tubular extension for the free displacement of the head of the crank rod. This arrangement increases the strength and assures a maximum varying surface to the wrist pin for a certain outer diameter of the tubular extension.

The wrist pin is located in this lower reinforced portion of the central tubular extension and approximately intermediate the upper and lower ends of the same.

The operative portions or engagement surfaces of the wrist pin are located directly 1. Towards the interior of the tubular extension by the flattened portions of said extension;

2. Towards the outer surface by their own length.

There are no cylindrical bushings for supporting the wrist pin.

The central tube extension T may be reinforced on each side of a certain arc preferably divided into two equal parts on a plane at substantially right angles to that of rotation of the crank. This reinforcement is external and extends over the entire height of the tubular extension. It is induced by increasing its original diameter through an extension $t$, Figure 2.

In the interior of the tubular extension and over a certain portion beginning on the head of the piston, the tubular extension may also be reinforced by a flattened portion $t'$, Figures 2 and 3, parallel to the plane of rotation of the crank.

A radial rib $n$, Figures 1, 2 and 3, connects the head and piston on each side with the upper end of the lower flattened portion.

This rib also increases the strength of the piston, and on removal of the casting from the mold in the manufacture of the piston, causes the tubular extension to cool off slowly owing to the heavier wear thickness.

The end surface F of the piston, Figures 1 and 3, also has a cross section in the corresponding thickness from the center of said head towards the tubular extension and it has a decreased thickness beyond the tubular extension to the periphery of the piston. The peripheral connection and end wall of the piston and of the top of the skirt is effected at any rate by a reinforced portion which has a suitably rounded fillet.

The lower part of the pillar T or otherwise formed parts for the support of the bosses W consists of different and attached material, this attachment being effected by any means whatsoever to the upper part, cast with the bottom of the piston F, and so on.

The skirt J is reinforced by two diametrically opposite ribs N (Figures 1, 2 and 3) to withstand the oblique pushing stresses set up by the connecting rod. It is also feasible, in order to reduce the weight of the skirt as much as possible, to include the important feature of rendering the skirt resilient and deformable so as to make it possible to construct the pistons of light weight alloy with a small clearance only, notwithstanding that they have a great coefficient of expansion.

There is provided on each side of the skirt a cut-out part E, Figures 1 and 3, permitting the wrist pin to be put in position laterally. This cut-out is continued down to the very edge of the skirt and may have a uniform width or may be progressively widened downwardly. In its upper part this cut-out portion is preferably terminated by the arc of a circle $e$ which may be concentric to the wrist pin, Figure 3.

Each of the two separate parts of the skirt J forming the guiding surfaces of the piston constitutes a solid body free at one end, namely at the lower end of the skirt, but fixed at the other end, namely at the head of the piston and having no other point of engagement between them. These parts $s$ may be yieldingly deformed under the action of stresses exerted along their surface.

The transmission of lateral stresses through the head of the piston and the contiguous top of the skirt, which stresses are caused whenever the crank rod assumes an angular position, induces on the guiding surfaces a yielding deformation owing to the reactions produced and this deformation extends over the entire surface where it is in contact with the cylinder. There is produced thereby even with new pistons, immediately an engagement surface completely in registry with the guiding surface of the piston skirt. Pistons such as are now in use first engage the cylinder along a single line only and the contact surface increases solely in proportion to the wear of the piston and of the cylinder.

The yielding guiding portion, the lower diameter of which may be slightly greater than that above, may be introduced at its lower end within the cylinder with an extremely small clearance, or no clearance whatsoever, or this lower edge of the skirt may even have a diameter which is greater than the diameter of the bore of the cylinder.

The resilient portion of the skirt may even be in the shape of a truncated cone having its base on the base of the piston, or it may be a double truncated cone with the lower portion of a less taper than the upper portion, or it may also be a truncated cone at the top, and a cylinder at the bottom portion.

For the purpose of reducing the weight, the strength, the limits of yielding deformation and the transmission of heat, the described arrangement may be of particular value, particularly whenever the two separated portions of the skirt J having decreased thickness from above downwardly as clearly shown in Figures 1 and 3.

In order to apply the invention to pistons of known type, provided at the upper end with a lateral extension R shown in dotted lines in Figure 1, the internal surfaces $r$ and $r_1$ (Figures 3 and 4) are placed as follows: The peripheral face $r$ is in alignment with the internal surface $j$ of the skirt J in its upper part where the piston rings are located.

The central peripheral face $r_1$ is in alignment with the outer surface $g$ of the central tubular extension.

The extension R is provided with a partition (Figures 3 and 4) by the continuation of the rib N situated on the same side. In this case the length of the arc and the reinforcing part $t$, Figure 2, of the tubular extension must not abut on the inner central face of the extension R so as to permit the piston to be removed from the mold.

It will be seen that it is advisable to machine the interior and exterior of the skirt of the piston over its entire height.

The tubular extension T may be machined on the outer surface.

The head F of the piston can be partly machined in its interior. Any machining, however, may entirely be omitted when the piston is cast in metallic molds producing particularly good castings.

It is clear furthermore that the invention should not be limited solely to the embodiments described and shown. Other modifications of form, dimension and detail may be applied to the present case without departing from the spirit of the invention.

What I claim is:

1. An internal combustion engine piston having a head and a central tubular extension secured directly to the head, and provided with bearings for a wrist pin wherewith to connect a crank rod to the piston, said piston also having an extension at its upper end, the outer wall of the inner side of which extension is in alignment with the inner surface of the piston wall while the inner side of the inner wall of said extension is in alignment with the wall of the central tubular extension for the wrist pin, said upper extension being reinforced by a rib located on the same side.

2. An internal combustion engine piston, having a head, a resilient skirt progressively decreasing downwardly in thickness connected solely directly to the head and having spaced slots open at the lower end and dividing the skirt into independently resilient portions, said piston also having a central tubular extension secured directly and solely to the head and spaced from and independent of the skirt, said tubular extension having bearings for a wrist pin wherewith to connect a crank rod to the piston.

3. An internal combustion engine piston as claimed in claim 2, in which one of the slots is relatively wide and is arranged in line with the bearings of the tubular extension to afford access to said bearings and the remainder of the slots are relatively narrow and in which certain of the independent portions of the skirt between slots are provided on their inner sides with reinforcing ribs which extend and are connected solely to the head.

In witness whereof I affix my signature.

ALBERT ALEXANDRE AUGUSTIN DARCHE.